US012739028B2

(12) United States Patent
Nuttall et al.

(10) Patent No.: US 12,739,028 B2
(45) Date of Patent: Sep. 15, 2026

(54) BASE STATION MANAGEMENT OF A CONNECTION OF A WIRELESS DEVICE TO A SATELLITE NETWORK

(71) Applicant: Skylo Technologies, Inc., Mountain View, CA (US)

(72) Inventors: Andrew Nuttall, Mountain View, CA (US); Soham Dhiren Desai, Palo Alto, CA (US); Meghna Agrawal, Cupertino, CA (US); Christopher Acker, San Mateo, CA (US)

(73) Assignee: Skylo Technologies, Inc., Mountain View, CA (US)

(*) Notice: Subject to any disclaimer, the term of this patent is extended or adjusted under 35 U.S.C. 154(b) by 365 days.

(21) Appl. No.: 18/383,202

(22) Filed: Oct. 24, 2023

(65) Prior Publication Data

US 2025/0132821 A1 Apr. 24, 2025

(51) Int. Cl.
*H04B 7/185* (2006.01)
*H04W 48/20* (2009.01)
*H04W 84/06* (2009.01)

(52) U.S. Cl.
CPC ..... *H04B 7/18547* (2013.01); *H04B 7/18539* (2013.01); *H04W 48/20* (2013.01); *H04W 84/06* (2013.01)

(58) Field of Classification Search
None
See application file for complete search history.

(56) References Cited

U.S. PATENT DOCUMENTS 11,041,959 B2 6/2021 Lucky et al.
11,632,166 B2 4/2023 Lucky et al.
(Continued)

FOREIGN PATENT DOCUMENTS

WO WO-2021032453 A1 * 2/2021 ........ H04W 56/0045

OTHER PUBLICATIONS

3rd Generation Partnership Project; Technical Specification Group Radio Access Network; Solutions for NR to support hon-terrestrial networks (NTN) (Release 16); 3GPP TR 38.821 V16.2.0 (Mar. 2023).

*Primary Examiner* — Saumit Shah
(74) *Attorney, Agent, or Firm* — Brian R. Short

(57) ABSTRACT

Apparatuses, methods, and systems of a base station of a satellite network managing a connection of a wireless device to the satellite network are disclosed. One method includes broadcasting location information of a satellite associated with the base station, broadcasting an effective communication range for wireless communications between the base station and the wireless device of a satellite beam, wherein the wireless device calculates a distance between the wireless device and a reference point associated with the satellite based on the broadcast location information of the satellite and a location of the wireless device, wherein the wireless device compares the calculated distance with the broadcast effective communication range, and determines a wireless signaling procedure to establish or maintain a wireless connection with the satellite network based on the comparison. The method further includes receiving, by the base station, the wireless signaling procedure from the wireless device.

19 Claims, 10 Drawing Sheets

(56) References Cited

U.S. PATENT DOCUMENTS

2020/0213000 A1* 7/2020 Arur .................... H04B 7/1851
2021/0099933 A1 4/2021 Matsuda et al.
2021/0352559 A1* 11/2021 Casamayón Antón ...................... H04W 36/322
2022/0086713 A1 3/2022 Maattanen et al.
2023/0354138 A1* 11/2023 Leng ..................... H04W 48/16
2024/0163754 A1* 5/2024 Hong .................... H04W 36/08
2024/0357460 A1* 10/2024 Cho .................... H04W 36/322
2025/0081060 A1* 3/2025 Li ..................... H04W 36/0094
2025/0274822 A1* 8/2025 Wang ................ H04W 36/0072

* cited by examiner

Broadcast List

1. Satellite Information
Satellite Location Ephemeris, effective communication range, reference point 2. Neighboring Cells
Adjacent cell 1 effective communication range R1 and Reference Point 1
Adjacent cell 2 effective communication range R2 and Reference Point 2

Θ – Elevation Angle between Wireless Device (WD) and reference point

α - Azimuth Angle between Wireless Device (WD) and reference point

BASE STATION MANAGEMENT OF A CONNECTION OF A WIRELESS DEVICE TO A SATELLITE NETWORK

FIELD OF THE DESCRIBED EMBODIMENTS

The described embodiments relate generally to wireless communications. More particularly, the described embodiments relate to systems, methods, and apparatuses for base station management of a connection of a wireless device to a satellite network.

BACKGROUND

Satellite networks operate to cover large areas and can have a large number of users. Further, only limited amounts of spectral resources are allocated to satellite networks. Accordingly, a satellite network should manage connectivity of wireless devices to the satellite network.

It is desirable to have methods, apparatuses, and systems for managing a connection of a wireless device to a satellite network.

SUMMARY

An embodiment includes a method of a base station of a satellite network managing a connection of a wireless device to the satellite network. The method includes broadcasting, by the base station, location information of a satellite associated with the base station, broadcasting, by the base station, an effective communication range for wireless communications between the base station and the wireless device of a satellite beam associated with the base station, wherein the wireless device calculates a distance between the wireless device and a reference point associated with the satellite based on the broadcast location information of the satellite and a location of the wireless device, wherein the wireless device compares the calculated distance with the broadcast effective communication range, and determines a wireless signaling procedure to establish or maintain a wireless connection with the satellite network based on the comparison. The method further includes receiving, by the base station, the wireless signaling procedure from the wireless device.

Another embodiment includes a system for managing connection of a wireless device to a satellite network. For an embodiment, the system includes the wireless device and a base station. The base station is configured to broadcast location information of a satellite associated with the base station, and broadcast an effective communication range for wireless communications between the base station and the wireless device of a satellite beam associated with the base station, wherein the wireless device calculates a distance between the wireless device and a reference point associated with the satellite, based on the broadcast location information of the satellite and a location of the wireless device, and wherein the wireless device compares the calculated distance with the broadcast effective communication range, and determines a wireless signaling procedure to establish or maintain a wireless connection with the satellite network based on the comparison. The base station is further configured to receive the wireless signaling procedure from the wireless device.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for managing a connection of a wireless device to a satellite network.

Figure 1:
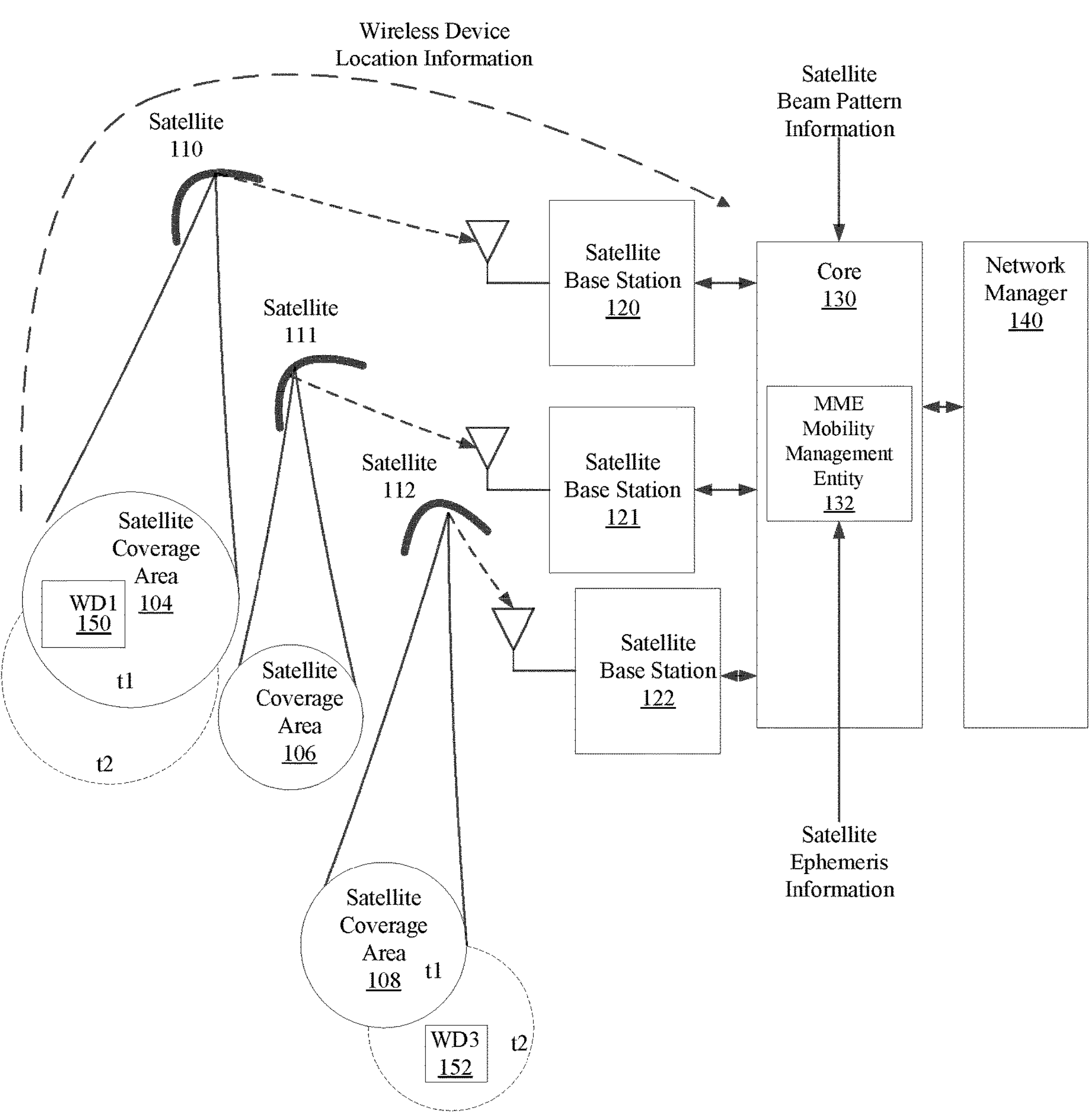
FIG. 1 shows a satellite network that includes a plurality of base stations, that manages wireless connectivity with a wireless device, according to an embodiment.

FIG. 1 shows a satellite network that includes a plurality of base stations 120, 121, 122, that manages wireless connectivity with wireless devices 150, 152, according to an embodiment. As shown, the plurality of base stations 120, 121, 122 provide wireless satellite network coverage 104, 106, 108 through corresponding satellites 110, 111, 112. For an embodiment, one or more of the satellites 110, 111, 112 have coverage areas that are changing over time. For example, as shown, satellite coverage area 104 changes from time t1 to time t2. Further, for an embodiment, the wireless devices 150, 152 that may be connected to the wireless satellite network move as well.

For an embodiment, the base stations 120, 121, 122 are electronically connected to a core network 130 of the satellite network. For an embodiment, the core network 130 is electronically connected to a network manager 140. For an embodiment, the core network 130 includes a MME (mobility management entity) 132.

For at least some embodiments, the base stations 120, 121, 122 are configured to broadcast location information of a satellite associated with the base station. For example, base station 120 broadcasts location information of satellite 110. The base station 120 is further configured to broadcast an effective communication range for wireless communications between the base station 120 and the wireless device 150 of a satellite beam associated with the base station 120. For an embodiment, the wireless device 120 is configured to calculates a distance (wherein the distance includes at least one of a linear distance or an angular distance) between the wireless device 120 and a reference point associated with the satellite 110 based on the broadcast location information of the satellite 110 and a location of the wireless device 150. For an embodiment, the wireless device 150 compares the calculated distance with the broadcast effective communication range and determines a wireless signaling procedure to establish or maintain a wireless connection with the satellite network based on the comparison. For an embodiment, the base station 120 receives the wireless signaling procedure from the wireless device 150. For an embodiment, the estimates of the locations of the satellites can include ephemeris data of each of the satellites.

Figure 2:
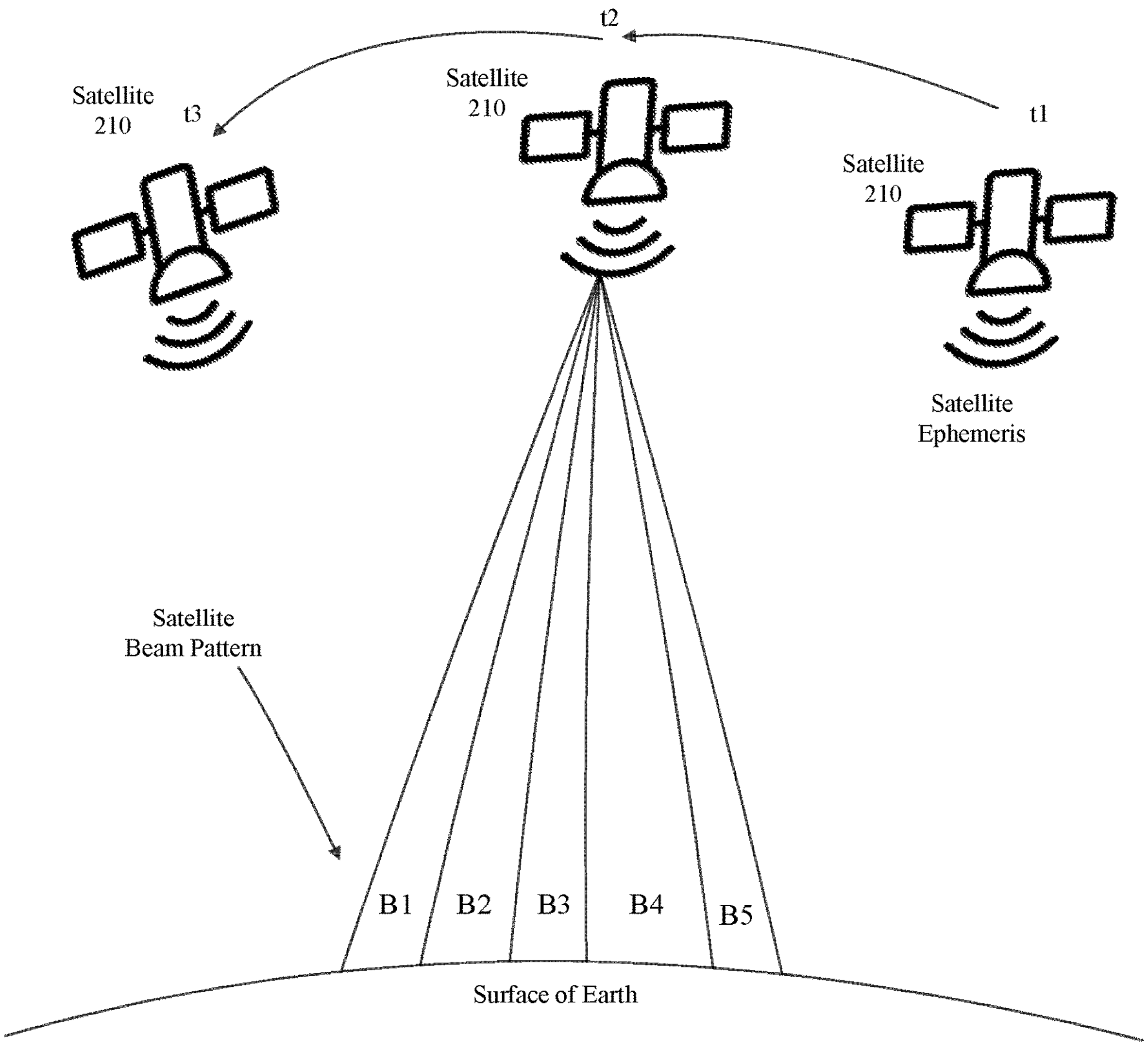
FIG. 2 shows a satellite in motion and beam patterns of the satellite, according to an embodiment.

FIG. 2 shows a satellite in motion and beam patterns of the satellite, according to an embodiment. As shown, the satellite 210 is in motion relative to the surface of the earth. Further, the satellite 210 has a beam pattern including beams B1, B2, B3, B4, B5. Both the position of the satellite 210 and the beam pattern of the satellite 210 can change with time. For an embodiment, the changing locations of the beams are used by the wireless device to determine whether to maintain connections with a cell formed by a beam or to select a new cell associated with another beam.

Figure 3:
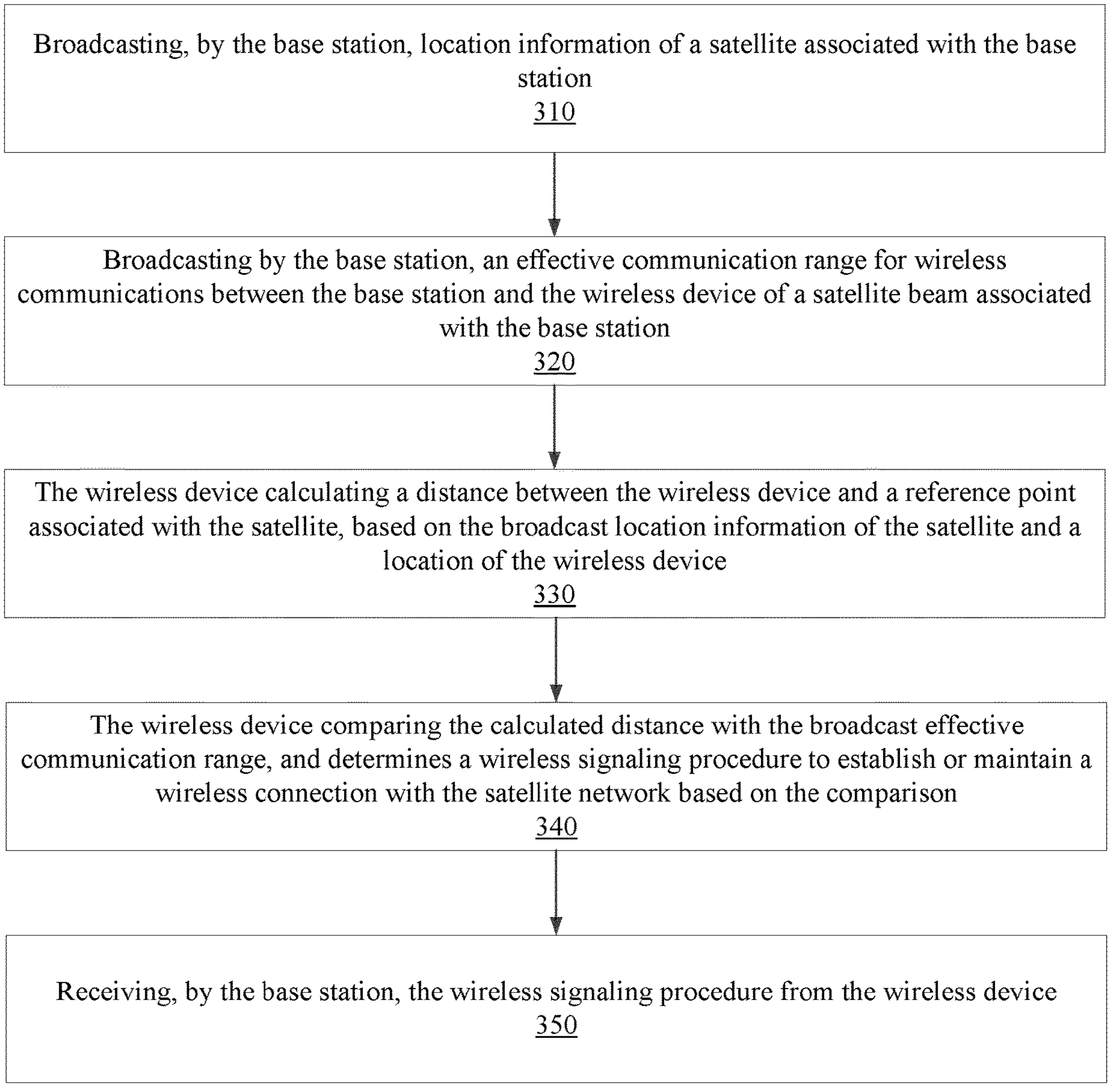
FIG. 3 is a flow chart that includes steps for managing a connection of a wireless device to a satellite network, according to an embodiment.

FIG. 3 is a flow chart that includes steps for managing a connection of a wireless device to a satellite network, according to an embodiment. A first step 310 includes broadcasting, by the base station, location information of a satellite associated with the base station. A second step 320 includes broadcasting, by the base station, an effective communication range for wireless communications between the base station and the wireless device of a satellite beam associated with the base station. A third step 330 includes the wireless device calculating a distance (wherein the distance includes at least one of a linear distance or an angular distance) between the wireless device and a reference point associated with the satellite based on the broadcast location information of the satellite and a location of the wireless device. A fourth step 340 includes the wireless device comparing the calculated distance with the broadcast effective communication range and determines a wireless signaling procedure to establish or maintain a wireless connection with the satellite network based on the comparison. A fifth step 350 includes receiving, by the base station, the wireless signaling procedure from the wireless device.

Location Information of the Satellite

For an embodiment, location information of the satellite includes ephemeris data of the satellite. For at least some of the described embodiments, the ephemeris data includes predicted or calculated positions of a satellite, planet, or comet in space over a specific period of time. For an embodiment, the location information includes satellite position coordinates and velocity of the satellite with respect to earth.

Effective Communication Range

For an embodiment, the effective communication range includes a distance that the wireless device utilizes to make cell selection decisions. For an embodiment, the effective communication range is a distance which indicates to a wireless device an additional parameter to track while making decisions about cell selection and reselection. For an embodiment, the effective communication range works alongside wireless device measurements like SINR (signal to interference and noise ratio) and RSRP (reference signal received power) for making a cell selection or reselection, or effective communication range can be used stand-alone to enforce decisions which involve staying in the same cell or moving to a new neighboring cell.

Reference Point(s)

For an embodiment, the reference point is defined as a distance relative to the satellite that is based on and corresponds with coverage areas corresponding with cells generated by beams of the satellite. For an embodiment, the reference point is defined as distance and an orientation relative to the satellite that is based on and corresponds with coverage areas corresponding with cells generated by beams of the satellite. For an embodiment, the reference point indicates the center of the coverage area of the beam which is relative to the satellite position. For an embodiment, the base station broadcasts multiple effective communication radii and reference points of neighboring cells of the base station, or neighboring cells of one or more other base stations.

Calculated Distance

For at least some embodiments, the wireless device makes decisions about cell selection and reselection based on the comparison between the calculated distance and the effective communication range. Based on the comparison, the wireless device starts a signaling procedure to the base station. For an embodiment, the wireless device determines its own location (for example, through GPS (global positioning system)) and then calculates the distance (calculated distance) between the location of the wireless device and the location of the satellite as provided by the location information of the satellite.

Cell

For at least some embodiment, a cell is defined by a coverage area of a beam formed by a satellite. Neighboring (adjacent) cells may be formed by a beam of the satellite or formed by a beam of another satellite. Further, for at least some embodiments, different satellites may be associated with the same or different base stations. For various embodiments, the coverage area can be stationary or moving with different speeds as shown in FIGS. 1, and 2. For example, GEO (Geostationary) satellites generally have a stationary coverage while LEO (Low Earth Orbit) satellites can have a fast-moving coverage area.

Wireless Signaling Procedure.

For at least some embodiments, the wireless signaling procedure includes using the current (serving) cell to exchange data. That is, the serving cell is the cell that corresponds with the beam of the satellite that was last used by the wireless device to wirelessly communicate with the base station. For an embodiment, the wireless signaling procedure also includes sending a PRACH (physical random-access channel) (for example, an initial RRC (radio resource connection message) to a neighboring cell to exchange data with the neighboring cell). For an embodiment, the wireless signaling procedure also includes the wireless device sending its own location to the serving (base station of the current cell) or a base station of the neighboring cell. For an embodiment, the wireless signaling procedure also includes sending a tracking area message to the serving or neighboring cell. For an embodiment, the wireless signaling procedure also includes a cell selection or a cell reselection by the wireless device. For an embodiment, the wireless signaling procedure may further include the wireless device staying in an idle mode (in this case the wireless device does not send any message to the base station but stays in the idle mode and listens to the paging opportunities from the selected base stations).

For an embodiment, after receiving the wireless signaling procedure, the base station is further configured to schedule frequency and time resources for downlink wireless communications with the wireless device. For an embodiment, the scheduling includes scheduling resources (time and/or frequency) for downlink communication, hand-over decisions for the wireless device (from one cell to a neighboring cell), planned hand-over decisions for the wireless device for large transmissions, and/or planned resource allocation and downlink packet delivery process. If a large packet (larger than a threshold) is to be transmitted (from base station to the wireless device, or from the wireless device to the base station), based on the location of the wireless device, the base station can calculate the projected coverage map for the wireless device. For an embodiment, if the projected coverage map indicates the wireless device is going to go out of coverage from serving cell 1 and move to new cell 2 in x minutes, the base station after communicating with the core network can make decisions about scheduling A number of resources (packets) from serving cell 1 and B number of resources (packets) from new cell 2. For an embodiment, the velocity of the wireless device along with the location information from the wireless device can be used by the base station (core network) to calculate the projected coverage. Usually, the velocity of the wireless device is much lower than the velocity of a low orbit satellite and can be avoided in the calculation.

For an embodiment, the wireless device compares the calculated distance with the broadcast effective communication range and determines cell selection decisions including initiating a connection to a new cell, maintaining a connection to a current cell, or initiating a connection to a different cell. For an embodiment, the wireless device further compares the calculated distance with the broadcast effective communication range and determines cell selection decisions including initiating a scan and maintaining connection with the current serving cell. If the calculated distance of the neighboring cell is larger than the effective communication range, the wireless device can decide not to initiate a scan, and the wireless device may stay with the current serving cell. Similarly, the wireless device can trigger a cell scan if the effective communication range requirements are met. For an embodiment, if the calculated distance is greater than the effective communication range, then the wireless device can initiate a scan to determine if a better (neighboring) cell should be selected. If the calculated distance is less than the effective communication range, then the wireless device can continue to maintain a connection with the current serving cell. For an embodiment, the scan is a procedure wherein the wireless device changes to various frequencies of reception and calculates received signal power readings from the cells. The wireless device may then decode the broadcast messages to get the needed details for connection.

For an embodiment, the wireless device compares the calculated distance with the broadcast effective communication range and determines cell selection decisions including initiating a scan for a cell on a terrestrial network. As previously described, for an embodiment, the effective communication range is a distance which indicates to a wireless device an additional parameter to track while making decisions about cell selection and reselection. For an embodiment, the effective communication range works alongside wireless device measurements, such as, SINR (signal to interference and noise ratio) and RSRP (reference signal received power) or it can be used stand-alone to enforce decisions which involve staying in the same cell or moving to a new neighboring cell. For example, when the wireless device is still in the center of the effective communication range, the wireless device can stay in the same cell even though the cell RSRP and SINR measurements are lower temporarily compared to a neighboring cell. For an embodiment, the wireless device may move to a new cell if the distance calculated by the wireless device is greater than the effective communication range, or the wireless device may select to scan a terrestrial mode scan and scan other networks, such as a Wifi network. For an embodiment, the wireless device can decide to scan for terrestrial (non-satellite) and Wifi networks if the wireless device is within the effective communication range but is not finding a strong enough satellite signal. For an embodiment, the wireless device can also scan terrestrial and Wifi networks periodically when a preference of terrestrial and Wifi networks is higher than the satellite network. Other networks may be preferred for capacity or cost reasons.

Figure 5:
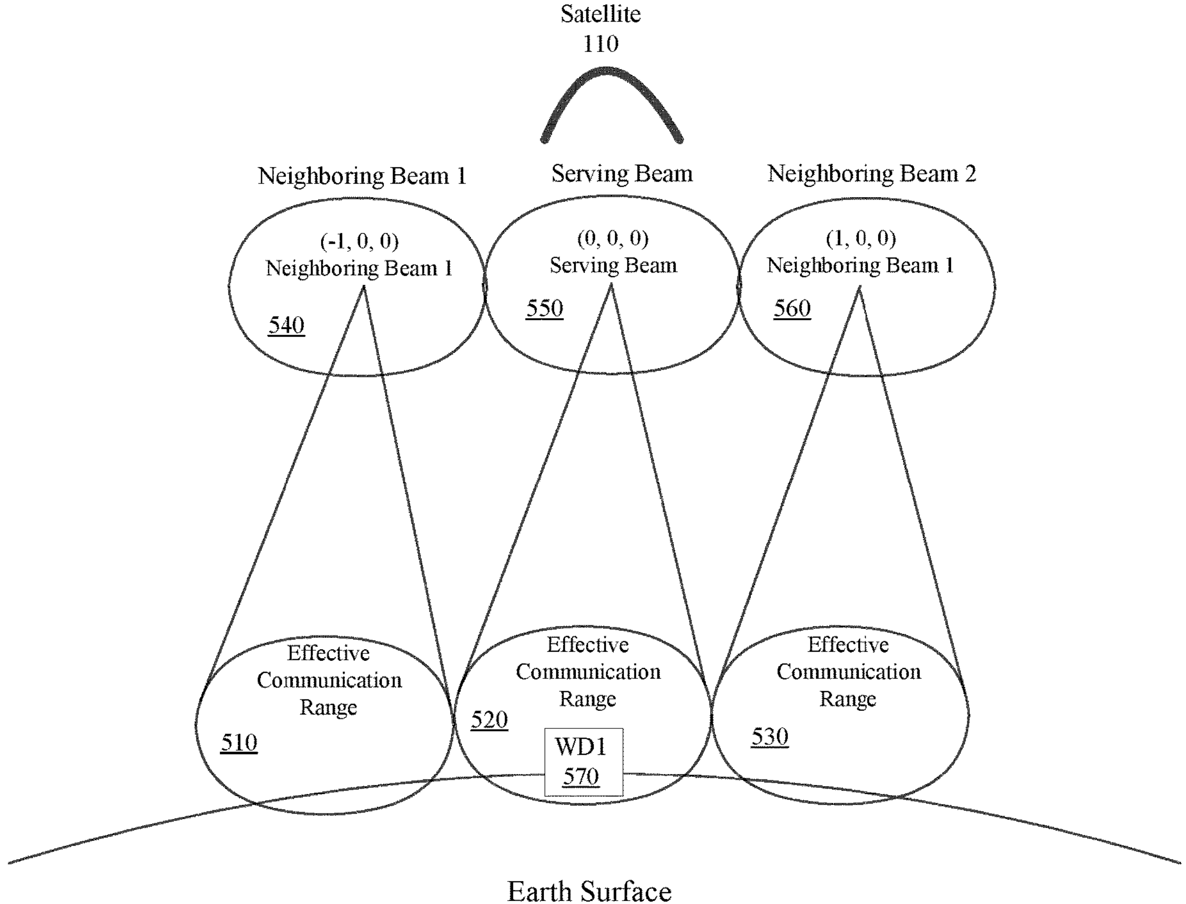
FIG. 5 shows a plurality of beams for a satellite along with broadcast reference points and an effective communication range for each of the plurality of beams, according to an embodiment.
Figure 6:
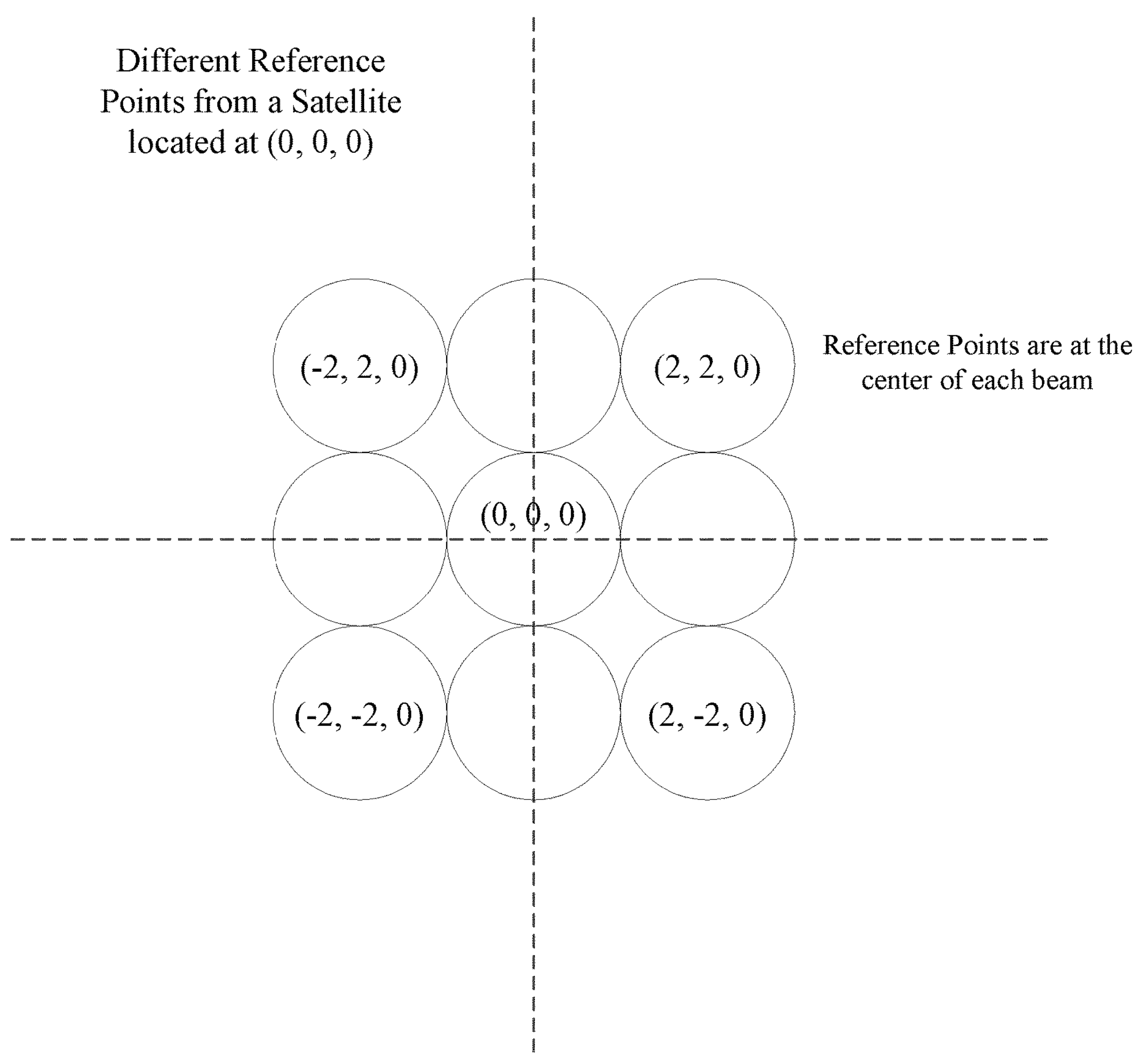
FIG. 6 shows reference points for each of a plurality of beams of a satellite, according to an embodiment.

At least some embodiments further include broadcasting, by the base station, the reference point in combination with the effective communication range, wherein the reference point is an offset relative to a position (location) of the satellite. For an embodiment, the base station can select the reference point based upon the satellite beam pattern and the location of the beam coverage area. For an embodiment, the base station can select the reference point based upon the satellite orbit. For a LEO (low earth orbit) satellite the reference point may be selected as an offset from the satellite instead of an offset from the center of coverage area. For an embodiment, the offset can also be defined based on the location of the beam coverage area with respect to the location of the satellite. For an embodiment, a satellite can have multiple beams, wherein only a few beams are directly below the satellite and all other beams are at an offset from the satellite as shown in FIGS. 5 and 6.

For an embodiment, the reference point is defined as a distance relative to the satellite that is based on and corresponds with coverage areas corresponding with cells generated by beams of the satellite. For an embodiment, the reference point is defined as a distance and an orientation relative to the satellite that is based on and corresponds with coverage areas corresponding with cells generated by beams of the satellite. For an embodiment, the reference point indicates the center of the coverage area of the beam which is relative to the satellite position. For an embodiment, the base station broadcasts multiple effective communication radii and reference points of neighboring cells of the base station, or neighboring cells of one or more other base stations.

For an embodiment, the effective communication range is a radius that the wireless device uses to prioritize an associated cell or associated cells. For an embodiment, the prioritization of each of the cells is dependent on the effective communication range from the reference points, other broadcast parameters from different beams, and/or device signal strength measurements. For example, new (additional) broadcast parameters can work alongside wireless device measurements like SINR and RSRP or the new broadcast parameters can be used stand-alone to enforce decisions which involve staying in the same cell or moving to a new neighboring cell. Further, for example, if the wireless device is still in the center of the effective communication range, the wireless device can stay in the same cell even though the cell RSRP and SINR measurements are lower temporarily compared to a neighboring cell.

An embodiment further includes adaptively selecting, by the base station, the effective communication range. For an embodiment, the effective communication range is adaptively selected based on a beam coverage location of a beam formed by the satellite. Some geographical areas have a higher limit for power transmission compared to others. Therefore, when the satellite beam is covering those areas, the network can dynamically increase the gain settings which increases the effective communication range. For an embodiment, the base station adapts effective communication range dynamically based upon the beam coverage area location (latitude/longitude of the coverage area), satellite transmit and receiver properties, receiver (of the wireless device) and transmit properties of the target devices communicated using the satellite link and the interference. Further, for an embodiment, the base station adapts the effective communication range based upon the network load. For example, if the network load is high, the effective communication range is reduced. Further, for an embodiment, the base station controls the coverage area of the beam by adapting the reference location and effective communication range.

An embodiment includes adaptively selecting the reference point based on a beam coverage location of a beam formed by the satellite. For an embodiment, the satellite network adaptively configures the reference point based on the beam coverage location of the beam. For an embodiment, the reference point depends upon the current coverage area of the beam and as the coverage area. For an embodiment, the satellite network updates the coverage area as the beam pattern changes with time and earth curvature. For an embodiment, if the wireless device is moving away from the beam center and the calculated distance is greater than 90% (or some other preselected percentage) of the effective communication range, this indicates that the device may go out of coverage within a threshold time. In this situation, the wireless device can hold the mobile originating data transmission and initiate a cell selection. Further, the wireless device can start mobile originating data transmission when the wireless device enters the coverage area of the neighboring beam. This helps to minimize the handovers between cells during the data transmission.

Figure 7:
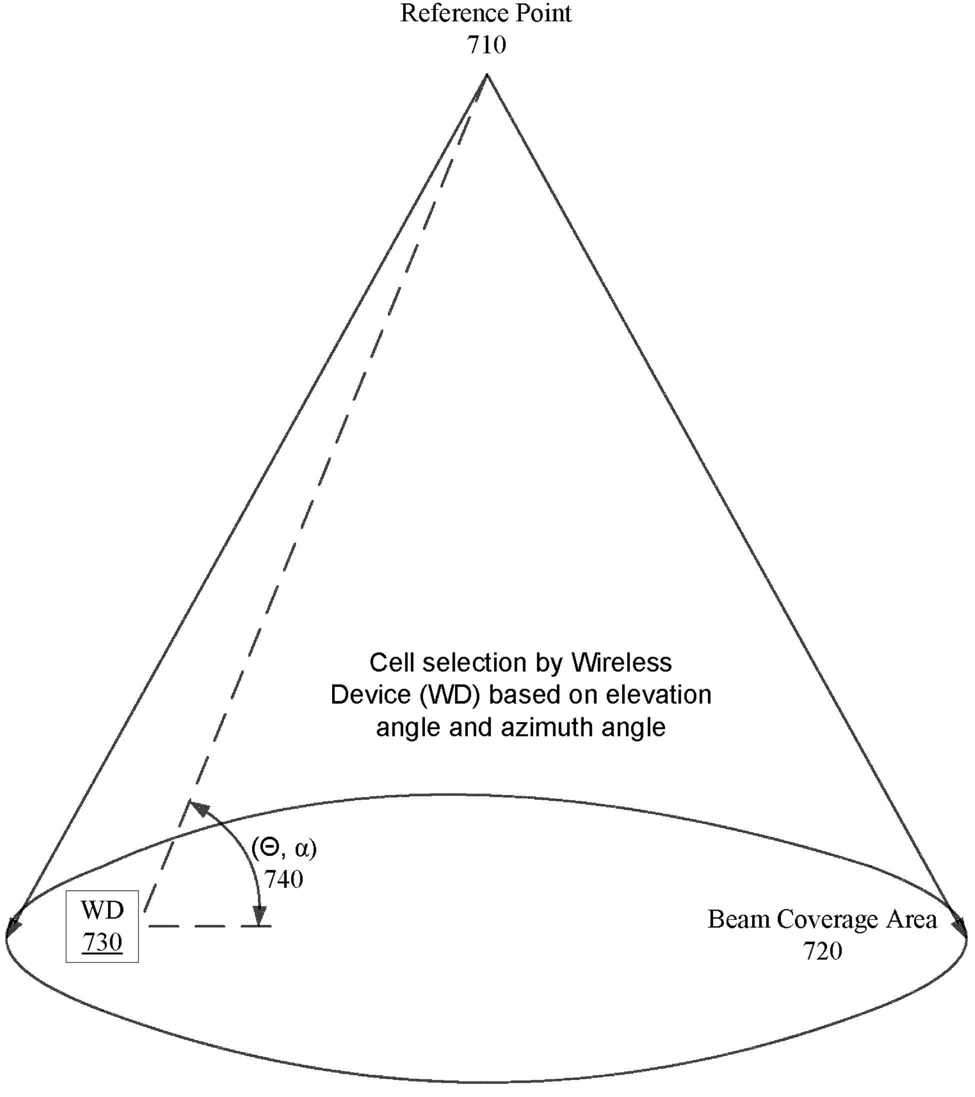
FIG. 7 shows an elevation angle and an azimuth angle between a wireless device and a reference point of a satellite that can be used by a wireless device for cell selection, according to an embodiment.

For an embodiment, the effective communication range includes an effective elevation angle, and the distance calculated by the wireless device includes an elevation angle (distance) as shown in FIG. 7. For an embodiment, the effective elevation angle changes over time (for example, for a LEO satellite). For an embodiment, the base station broadcasts the effective elevation angle as the broadcast offset. For example, at time x, the wireless device may calculate the elevation angle. From the broadcast offset, the wireless device knows that at time Y, the elevation angle will change by the number of degrees as indicated by the offset. The broadcast offset can be used along with the coverage angle to make decisions about signaling to the base station. For an embodiment, the wireless device has information about the neighboring cells/beams and their predicted elevation angles over time. The wireless device can make reselection decisions based on the elevation angle, which can selectively be between 45 to 90 degrees.

For an embodiment, the effective communication range includes a function based on a set of angles from the reference point, and wherein the calculated distance is based on a set of angles to the reference point from a position of the wireless device. For an embodiment effective communication range is defined as range of elevation angle and azimuth angle between the wireless device and satellite reference point. The range of elevation angle can depend upon the azimuth angle.

For an embodiment, the wireless signaling procedure includes selecting an initial cell from one or more cells formed by one or more of a plurality of satellite beams. For an embodiment, the wireless signaling procedure includes selecting a different cell from one or more cells formed by one or more of the plurality of satellite beams. The calculated distance for each of the cells is a factor in the cell selection/reselection process. For an embodiment, additional broadcast parameters work alongside wireless device measurements like SINR and RSRP or it can be used stand-alone to enforce decisions which involve staying in the same cell or moving to a new neighboring cell. For example, new (additional) broadcast parameters can work alongside wireless device measurements like SINR and RSRP or the new broadcast parameters can be used stand-alone to enforce decisions which involve staying in the same cell or moving to a new neighboring cell. Further, for example, if the wireless device is still in the center of the effective communication range, the wireless device can stay in the same cell even though the cell RSRP and SINR measurements are lower temporarily compared to a neighboring cell.

For an embodiment, the wireless device continuously monitors signal strengths (SINR and RSRP) of the beam of the satellite network. The measure signal strengths have a direct relation to the data rate that the network can support at any point in time. Further, the measured signal strengths are typically inversely proportional to the distance from the satellite (larger distance, larger pathloss). If the wireless device is to use an application which needs high data rate (high MCS (modulation and coding scheme)), the wireless device can postpone transmission of data based on the distance from the serving cell and neighboring cell. If the serving cell is going out of coverage in a short time (lesser time compared to what the wireless device anticipates it needs to complete its high data rate transmission), the wireless device waits until the wireless device is in the range of its neighboring cell to start the data transmission after cell reselection. For an embodiment, the wireless device schedules communication with the base station through multiple cells based on projected cell connections (based on the projected distance from different satellites or the same satellite of a new cell), data rate demands, uninterrupted service requirement (low latency requirement need by, for example, voice data traffic) of the scheduled communications. For example, when a wireless device moves from one beam coverage area to another beam coverage area, then either the wireless device breaks the connection with one base station before connecting to another base station or the wireless device uses handover between the two base stations. Both require significant network overhead. A handover or connection breakout can also add additional delay for the ongoing applications using satellite communication. Therefore, it is desirable to complete the data exchange without the need of handing over from one cell to another cell. For an embodiment, when a wireless device has coverage from multiple base stations, the wireless device can use the beam which can support uninterrupted data communication for a longer duration.

For an embodiment, each of the multiple effective communication radii has a value based on the coverage area of a corresponding cell. For an embodiment, the effective communication range depends upon the size of the beam coverage area. If beam coverage areas of the different beams are of the same size, then the communication radius can be the same for multiple base stations. For an embodiment, the reference point depends upon the relative location of the beam coverage area. For an embodiment, different beams can have different effective coverage areas.

For an embodiment each satellite beam of a plurality of satellite beams of the satellite network broadcasts cell selection information.

At least some embodiments further include broadcasting, by each base station in the satellite network, information, wherein the broadcast information includes a receiver performance indicator of the base station, and a network transmit performance indicator. For an embodiment, the receiver performance indicator includes a receiver sensitivity for a frequency at the base station, and a satellite G/T (gain to noise temperature). For an embodiment, the network transmit performance indicator includes at least a power level (EIRP (equivalent isotropic radiated power)) that base station/cell is broadcasting at. For an embodiment, the network parameter list includes the receiver performance indicator of the base station, and the network transmit performance indicator. At least some embodiments further include the core network using the receiver performance indicator of the base station, and the network transmit performance indicator to make decisions about initiating procedures to communicate with the wireless device. For an embodiment, the wireless device uses the receiver performance indicator of the base station and network transmit performance indicator to estimate the pathloss between the wireless device and the base station which can be used to make decisions about cell reselection.

The Satellite Antenna gain-to-noise-temperature (G/T) is a figure of merit in the characterization of antenna performance, where G is the antenna gain in decibels at the receive frequency, and T is the equivalent noise temperature of the receiving system in kelvins. The path loss, or path attenuation, is the reduction in power density of an electromagnetic wave as it propagates through space. Path loss is a major component in the analysis and design of the link budget of a telecommunication system. The EIRP (Effective Isotropic Radiated Power) is a calculation used to estimate the radiated output power of an isotropic antenna. The receiver sensitivity is the minimum power level at which the receiving node is able to clearly receive the bits being transmitted.

For at least some embodiments, the base station(s) can broadcast following parameters to facilitate the cell reselection by the wireless device:

| Parameter | Description |
|---|---|
| Ephemeris data (Location of Satellite) | Satellite position data |
| Beam maps (Contours) | Coverage area boundaries |
| Signal measurement thresholds | Signal measurement thresholds to trigger cell selection Contextual signal data |
| Satellite RF characteristics | G/T of the satellite |
| System Information Block (SIB) 3 parameter for Hysteresis during Cell Reselection (The delta between the cell measurements from 2 candidates which the UE needs to meet to do a cell reselection, the new cell must be hysteresis dB better) | Hysteresis threshold used during cell reselection. This prevents frequent toggling of cell reselection between different beams. |
| SIB 5 frequency neighboring cells broadcasted by the serving cell | Downlink carrier frequency for inter-frequency neighboring cells. Similar parameter exists for intra frequency too. |
| SIB 5 frequency offset for neighboring cells broadcasted by the serving cell | Frequency offset(s) for inter-frequency neighboring cells. |

Figure 4:
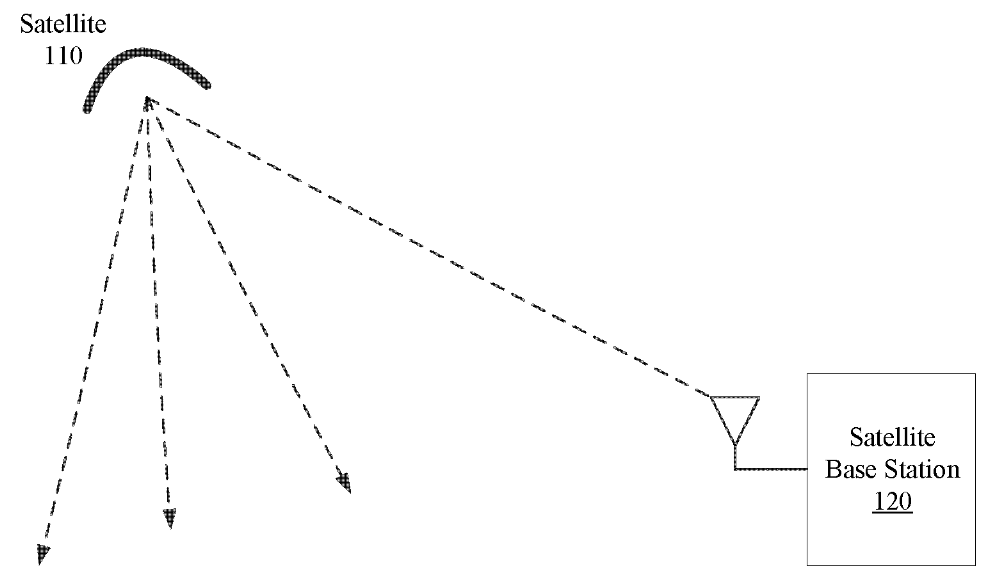
FIG. 4 shows a base station broadcasting a list of parameters including satellite information and neighboring cell information that a wireless device uses for making cell selections, according to an embodiment.

FIG. 4 shows a base station 120 broadcasting a list of parameters including satellite information and neighboring cell information that a wireless device uses for making cell selections, according to an embodiment. For various embodiments, the broadcast parameters include the satellite location Ephemeris of the broadcasting satellite, the effective communication radius and offset of the broadcasting satellite, and elevation and azimuth angle range. Further, for at least some embodiments, the broadcast parameters include offsets (reference points) for neighboring cells, and/or effective communication radii or elevation angles of the neighbor cells. Further, for at least some embodiments, the broadcast parameters include elevation and azimuth angle range. For an embodiment, the base station can decide to send any combination of parameters listed above. For example, some broadcast messages can broadcast serving cell parameters only.

FIG. 5 shows a plurality of beams for a satellite along with broadcast reference points and an effective communication range for each of the plurality of beams, according to an embodiment. As shown, three coverage areas 510, 520, 530 are formed by three different beams of the satellite 110. The base station broadcasts the effective communication range for each of the different beams and the reference points 540, 550, 560 associated with each of the three different beams. In FIG. 5, the positions of the reference points 540, 550, 560 are shown relative to the position of the satellite. Different coordinate systems and reference frames can be used by the base station to indicate the position of the reference point. In one embodiment, base station uses an ECEF (earth centered, earth fixed) coordinate system for reference points. As described, a wireless device 570 utilizes the reference points and the effective communication ranges to select which cell to initiate and/or maintain a wireless connection.

FIG. 6 shows reference points for each of a plurality of beams of a satellite, according to an embodiment. Here, each base station is mapped to a specific beam and position with respect to the satellite. Each base station broadcasts its own reference point (relative to the associated satellite) coordinates and its neighbors reference point coordinates. For an embodiment, each base station also broadcasts the effective communication radiuses. As shown, the reference points are at the center of each of the corresponding beams.

FIG. 7 shows an elevation angle and an azimuth angle 740 between a wireless device and a reference point 710 of a satellite that can be used by a wireless device 730 for cell selection, according to an embodiment. For an embodiment, the effective communication range includes a function based on a set of angles from the reference point, and wherein the calculated distance is based on a set of angles to the reference point from a position of the wireless device 730 when the wireless device 730 is within a beam coverage area 720 of the satellite. For an embodiment effective communication range is defined as range of elevation angle and azimuth angle between the wireless device and satellite reference point. The range of elevation angle can depend upon the azimuth angle.

Figure 8:
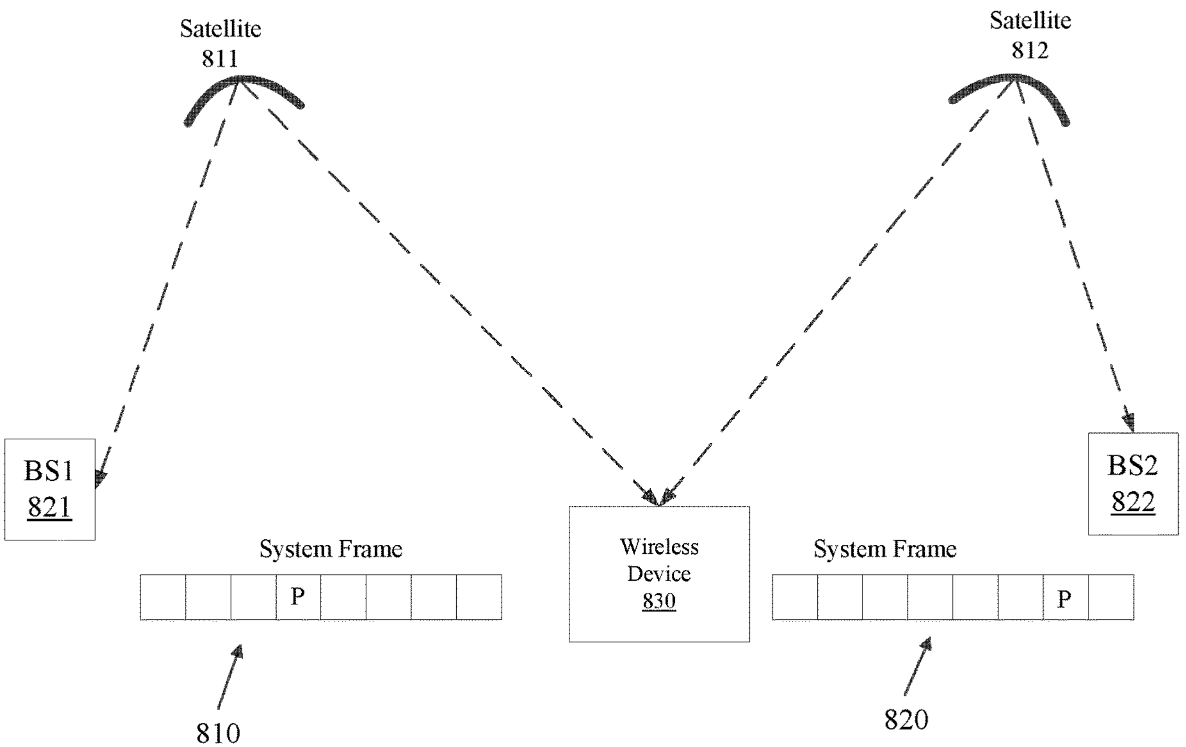
FIG. 8 shows a wireless device located within coverage areas of multiple base stations and synchronization of frames of each of the multiple base stations, according to an embodiment.

FIG. 8 shows a wireless device 830 located within coverage areas of multiple base stations 821, 822 and synchronization of frames 810, 820 of each of the multiple base stations 821, 822, according to an embodiment. As previously described, for an embodiment, the procedure to communicate with wireless device 830 includes sending paging signals from multiple base stations 821, 822 through satellites 811, 812.

As previously described, for an embodiment, when multiple base stations are initiating the procedure to communicate with the wireless device through paging, the paging of each of the base stations is selected so that the paging of the different base stations does not overlap in time. Based on the scheduling of the paging of the different base stations, the wireless device can hop between the frequency and time allocations of each of the base stations and attempt to receive the paging of each of the base stations. For an embodiment, the scheduling of the paging of the different base stations is performed by the core network of the satellite network. The frames 810, 820 indicate scheduled broadcasting of the paging by the different base stations 821, 822 in which the paging of the base station 821 as depicted by the system frame 810 is timed differently than the paging of the base station 822 as depicted by the system frame 820.

Figure 9:
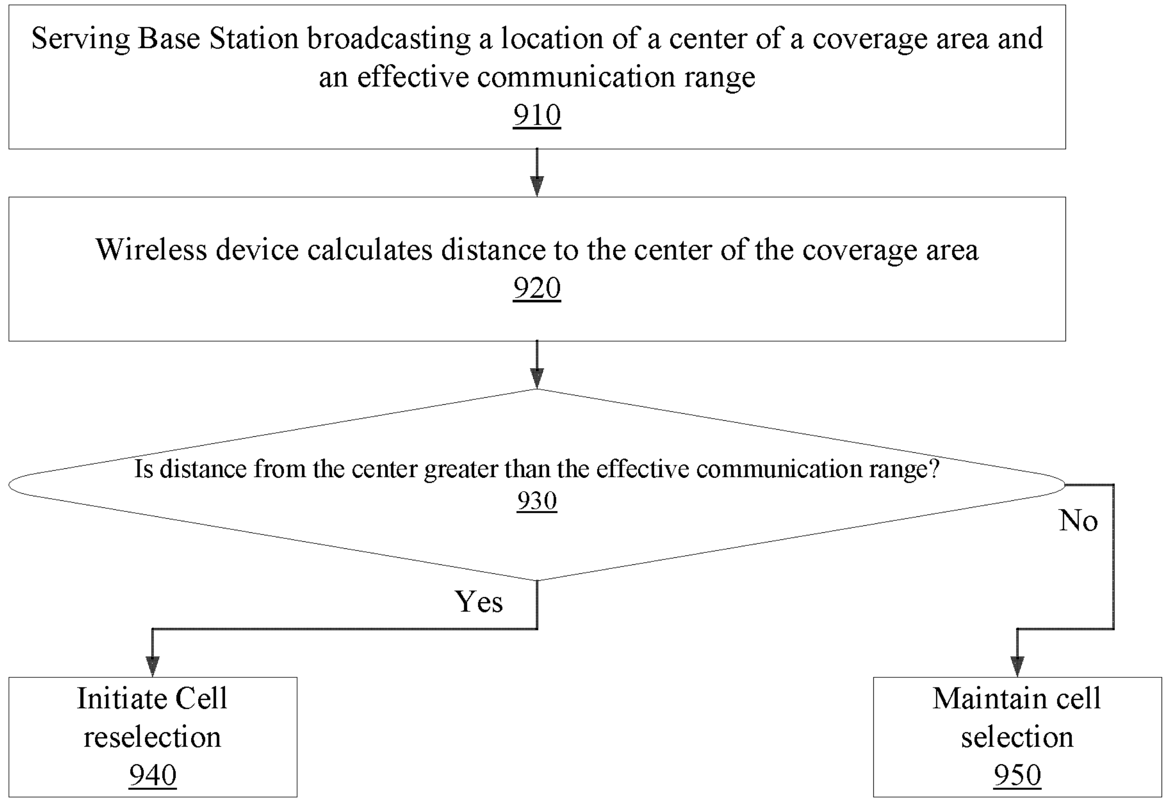
FIG. 9 shows steps of a method of a wireless device determining a cell selection, according to an embodiment.

FIG. 9 shows steps of a method of a wireless device determining a cell selection, according to an embodiment. A first step 910 includes a serving base station broadcasting a location of a center of a coverage area and an effective communication range. A second step 920 includes the wireless device calculating a distance to the center of the coverage area. A third step 930 included determining whether the distance from the center of the coverage area is greater than the effective communication range. If yes, a fourth step 940 includes the wireless device initiating a cell reselection. If not, a fifth step 950 includes the wireless device maintaining its cell selection.

Figure 10:
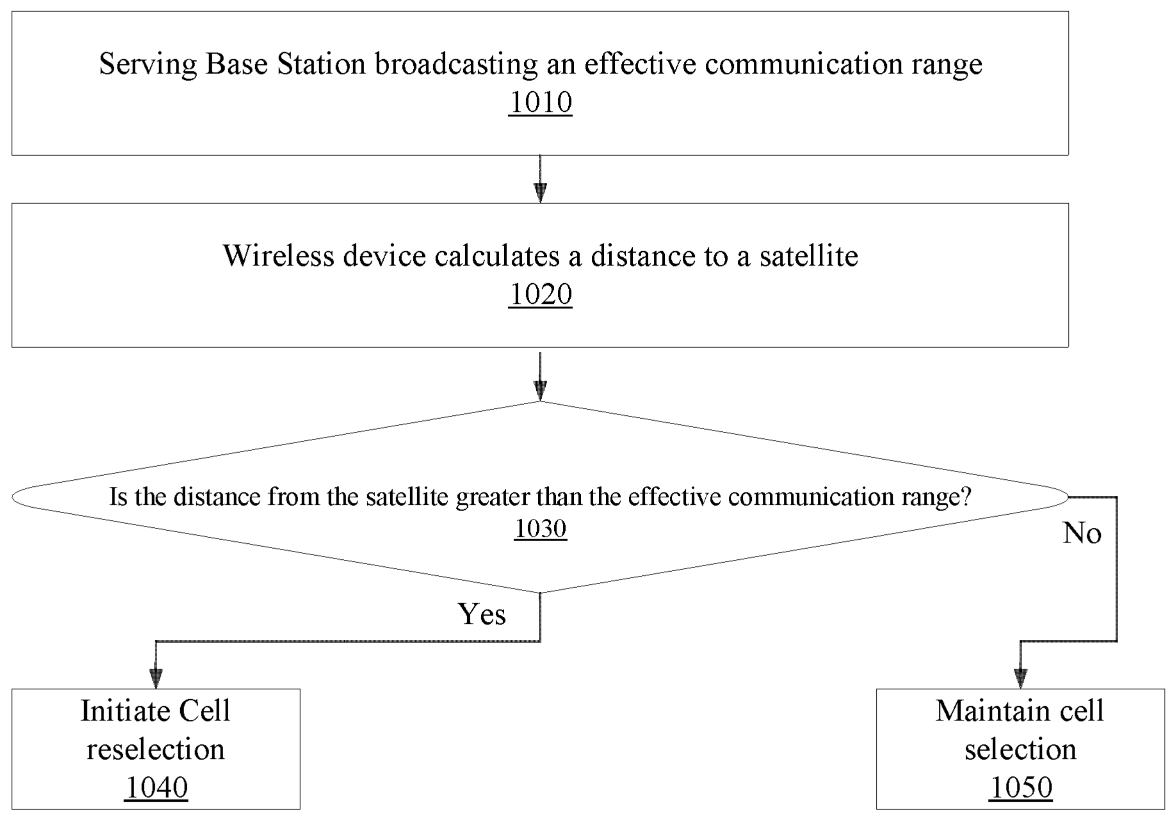
FIG. 10 shows steps of a method of a wireless device determining a cell selection, according to another embodiment.

FIG. 10 shows steps of a method of a wireless device determining a cell selection, according to another embodiment. A first step 1010 includes a serving base station broadcasting an effective coverage distance, wherein the effective communication range is a distance in which a wireless device can properly receive wireless signals from a satellite of the serving base station. Properly receiving can be determined, for example, by a received signal strength of wireless signals at the wireless device. A second step 1020 includes the wireless device calculating a distance to a satellite associated with the base station. A third step 1030 includes determining whether the distance from the satellite is greater than the effective communication range. If yes, a fourth step 1040 includes the wireless device initiating a cell reselection. If not, a fifth step 1050 includes the wireless device maintaining its cell selection.

Although specific embodiments have been described and illustrated, the embodiments are not to be limited to the specific forms or arrangements of parts so described and illustrated. The described embodiments are to only be limited by the claims.

What is claimed:

1. A method of a base station of a satellite network managing a connection of a wireless device to the satellite network, comprising:

broadcasting, by the base station, location information of a satellite associated with the base station;

broadcasting, by the base station, an effective communication range for wireless communications between the base station and the wireless device of a satellite beam associated with the base station, and multiple effective communication radii and reference points of neighboring cells of the base station, or neighboring cells of one or more other base stations;

wherein the wireless device calculates a distance between the wireless device and a reference point associated with the satellite based on the broadcast location information of the satellite and a location of the wireless device;

wherein the wireless device compares the calculated distance with the broadcast effective communication range, and determines a wireless signaling procedure to establish or maintain a wireless connection with the satellite network based on the comparison; and receiving, by the base station, the wireless signaling procedure from the wireless device.

2. The method of claim 1, further comprising:

scheduling, by the base station, frequency and time resources for downlink wireless communications with the wireless device after receiving the wireless signaling procedure from the wireless device.

3. The method of claim 1, wherein the wireless device compares the calculated distance with the broadcast effective communication range and determines cell selection decisions including initiating a connection to a new cell, maintaining a connection to a current cell, or initiating a connection to a different cell.

4. The method of claim 1, wherein the wireless device further compares the calculated distance with the broadcast effective communication range and determines cell selection decisions including initiating a scan and maintaining connection with a current serving cell.

5. The method of claim 1, wherein the wireless device compares the calculated distance with the broadcast effective communication range and determines cell selection decisions including initiating a scan for a cell of a terrestrial network.

6. The method of claim 1, wherein the effective communication range comprises a distance that the wireless device utilizes to make cell selection decisions.

7. The method of claim 1, further comprising broadcasting, by the base station, the reference point in combination with the effective communication range, wherein the reference point is an offset relative to a position of the satellite.

8. The method of claim 1, wherein the reference point is defined as a distance relative to the satellite that is based on and corresponds with coverage areas corresponding with cells generated by beams of the satellite.

9. The method of claim 1, wherein each of the multiple effective communication radii has a value based on a coverage area of a corresponding cell.

10. The method of claim 1, wherein the effective communication range is a radius that the wireless device uses to prioritize an associated cell.

11. The method of claim 1, further comprising adaptively selecting, by the base station, the effective communication range.

12. The method of claim 11, wherein the effective communication range is adaptively selected based on a beam coverage location of a beam formed by the satellite.

13. The method of claim 11, wherein the reference point is adaptively selected based on a beam coverage location of a beam formed by the satellite.

14. The method of claim 1, wherein the effective communication range comprises an effective elevation angle, and wherein the distance calculated by the wireless device comprises an angular distance.

15. The method of claim 1, wherein the wireless signaling procedure comprises selecting an initial cell from one or more cells formed by one or more of a plurality of satellite beams.

16. The method of claim 1, wherein the wireless signaling procedure comprises selecting a different cell from one or more cells formed by one or more of a plurality of satellite beams.

17. The method of claim 1, wherein each satellite beam of a plurality of satellite beams of the satellite network broadcasts cell selection information.

18. A method of a base station of a satellite network managing a connection of a wireless device to the satellite network, comprising:

broadcasting, by the base station, location information of a satellite associated with the base station;

broadcasting, by the base station, an effective communication range for wireless communications between the base station and the wireless device of a satellite beam associated with the base station, wherein the effective communication range comprises a function based on a set of angles from the reference point, and wherein the calculated distance is based on a set of angles to the reference point from a position of the wireless device;

wherein the base station broadcasts multiple effective communication radii and reference points of neighboring cells of the base station, or neighboring cells of one or more other base stations:

wherein the wireless device calculates a distance between the wireless device and a reference point associated with the satellite based on the broadcast location information of the satellite and a location of the wireless device;

wherein the wireless device compares the calculated distance with the broadcast effective communication range, and determines a wireless signaling procedure to establish or maintain a wireless connection with the satellite network based on the comparison; and receiving, by the base station, the wireless signaling procedure from the wireless device.

19. A system for managing a connection of a wireless device to a satellite network, comprising:

the wireless device;

a base station, the base station configured to:

broadcast location information of a satellite associated with the base station;

broadcast an effective communication range for wireless communications between the base station and the wireless device of a satellite beam associated with the base station, and multiple effective communication radii and reference points of neighboring cells of the base station, or neighboring cells of one or more other base stations:

wherein the wireless device calculates a distance between the wireless device and a reference point associated with the satellite, based on the broadcast location information of the satellite and a location of the wireless device;

wherein the wireless device compares the calculated distance with the broadcast effective communication range, and determines a wireless signaling procedure to establish or maintain a wireless connection with the satellite network based on the comparison;

wherein the base station is further configured to receive the wireless signaling procedure from the wireless device.

* * * * *